United States Patent [19]
Patigalia

[11] 3,871,489
[45] Mar. 18, 1975

[54] METHOD OF WEIGHING SOLID MATERIAL WETTED BY A NON-REACTIVE LIQUID

[75] Inventor: Edward N. Patigalia, Dover, N.J.

[73] Assignee: The United States of America as represented by the Secretary of the Army, Washington, D.C.

[22] Filed: Mar. 21, 1974

[21] Appl. No.: 453,479

[52] U.S. Cl. .................... 177/1, 177/207, 73/433
[51] Int. Cl. ...................... G01g 5/02, G01n 9/02
[58] Field of Search ............ 177/1, 82, 207; 73/433

[56] References Cited
UNITED STATES PATENTS
2,720,376  10/1955  Haglund.............................. 177/1

*Primary Examiner*—George H. Miller, Jr.
*Attorney, Agent, or Firm*—Robert P. Gibson; Nathan Edelberg; Thomas R. Webb

[57] ABSTRACT

A cup-shaped vessel, having a self-siphoning overflow means which determines a constant maximum volume, is filled with a non-reactive liquid of known density, such as Freon, and the vessel is weighed; a quantity of solid explosive material of known dry weight or dry density wetted by a film of the same kind of liquid is placed within the vessel, thereby displacing an equal volume of the liquid from the vessel, and the vessel is again weighed; then the dry density or dry weight, respectively, of the solid material is calculated, using the known dry weight or dry density of the explosive material, the density of the liquid, the two measured weights and the following relationships: (1) weight of vessel, liquid and explosive material equals weight of vessel and liquid alone plus dry weight of solid material minus weight of liquid displaced by the dry explosive material alone; (2) volume of dry explosive material equals volume of liquid displaced thereby; and (3) density equals weight per unit volume.

6 Claims, 2 Drawing Figures

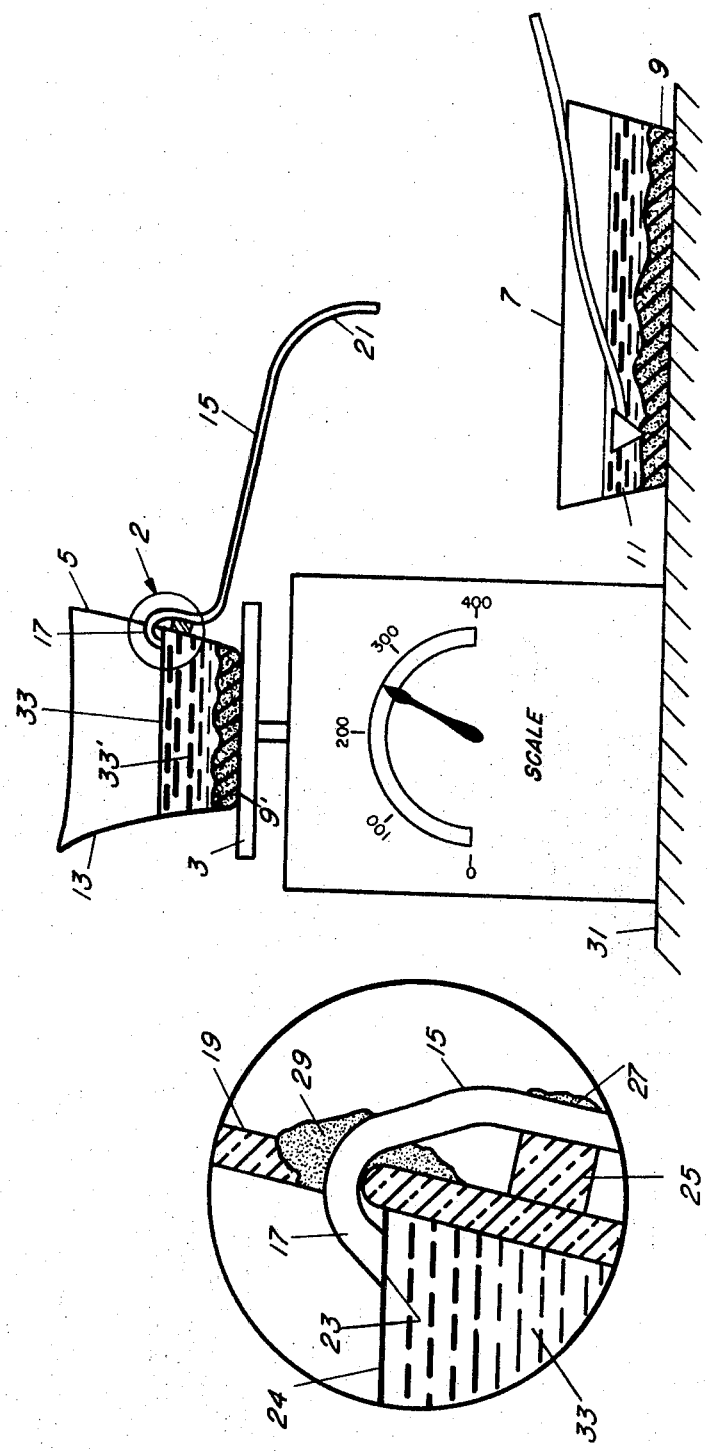

3,871,489

METHOD OF WEIGHING SOLID MATERIAL WETTED BY A NON-REACTIVE LIQUID

BACKGROUND OF THE INVENTION

It is often necessary to weigh sensitive solid explosive materials, such as lead azide, for example, in quantities that are too large to be safely handled in the dry state. Under such circumstances, the explosive material is usually weighed while immersed in or otherwise wetted by a liquid medium, such as water, which desensitizes the explosive material and thereby prevents it from exploding while it is wet. However, the usual weighing of a solid material while wet introduces inherent errors, because it is not possible to determine accurately which portion of the observed weight is solid material and which portion is liquid.

Wet solid explosive materials are usually weighed volumetrically by means of a receptacle of known volume. Employing the receptacle as a scoop, the wet explosive material is gathered until the known receptacle volume is completely filled, and the filled receptacle is weighed. If the observed weight (the receptacle may or may not be tared) falls within a specified tolerance, the desired dry weight of solid material is considered to be present. The relationship between the observed wet weight and the desired dry weight is established from previous drying and weighing of the explosive in question. This is, of course, undesirable, because of the hazardous condition associated with the explosive material in its dry state. The errors in this method lie in the difference between the measured bulk density and the actual bulk density of the wet material, and the question as to whether the receptacle is exactly filled with the explosive material. Because of these errors, the accuracy of this method is no better than 85 to 90%, depending on the skill of the operator.

SUMMARY OF THE INVENTION

An object of the present invention is to provide a new method of weighing a solid material that is wetted by a non-reactive liquid.

Another object is to provide a method of accurately determining the dry weight or dry density of a quantity of a solid material of known dry density or dry weight, respectively, wetted by a film of a non-reactive liquid of known density.

A further object is to provide a new method of isolating a desired dry weight of a granular solid material of known dry density from a supply of that material wetted by a non-reactive liquid of known density.

In accordance with one application of the invention: a cup-shaped vessel, having an overflow means which determines a constant maximum volume, is filled with a non-reactive liquid of known density to the level determined by the overflow means, and the vessel is weighed; a quantity of solid material of known dry density wetted by a film of the same kind of liquid is placed within the vessel, thereby displacing an equal volume of the liquid from the vessel and the vessel is again weighed; then, the dry weight of the solid material is calculated, using the known dry density of the solid material, the density of the liquid, the two measured weights, and the following relationship:

1. weight of vessel with the liquid and solid material equals weight of vessel with liquid alone plus dry weight of solid material minus weight of liquid displaced by the dry solid material alone;

2. volume of dry solid material equals volume of liquid displaced thereby; and 3. density equals weight per unit volume.

The same method is used to determine the dry density of a quantity of wet solid material of known dry weight.

A slightly modified method is used to isolate a desired weight of a granular material of known dry density from a supply of that material wetted by a non-reactive liquid of known density.

BRIEF DESCRIPTION OF THE DRAWING

FIG. 1 is a side elevation, partly in section, of an apparatus for weighing a solid material which is wet by a film of a non-reactive liquid, in accordance with the present invention; and FIG. 2 is an enlarged fragmentary section view of that portion of the apparatus of FIG. 1 within the circle 2.

DETAILED DESCRIPTION OF A PREFERRED EMBODIMENT

FIG. 1 shows an example of an apparatus for carrying out the method of the present invention. This apparatus comprises a direct-reading weighing scale 1 of suitable weighing capacity having a weighing platform 3, a cup-shaped weighing vessel 5 on the platform 3, and an open bowl 7 containing a supply of the solid explosive material 9 to be weighed immersed in a desensitizing liquid 11.

The measuring vessel 5 could be a conventional glass beaker the maximum volume of which is determined by its upper rim, or pouring spout. However, in order to obtain accurate results, the vessel 5 is preferably a self-siphoning pycnometer comprising a cup-shaped beaker 13 and a siphon tube 15 having an upper U-shaped end portion 17 rigidly attached to and extending through the side wall 19 of the beaker, and a lower end portion 21 pointing downward and extending below the open end 23 of upper portion 17. As shown best in FIG. 2, the open end 23 is preferably oriented in a horizontal plane, parallel to the liquid level 24 in the beaker, during weighing, to minimize the premature entrance of air to the open end 23. For example, the beaker 13 and siphon tube 15 may be of polyethylene, and the siphon tube 15 may be secured to the beaker 13 by a polyethylene block 25, polyethylene cement 27, and epoxy cement 29.

To carry out one application of the method of the present invention, the scale 1 with the vessel 5 thereon and the supply bowl 7 are placed on a horizontal support surface 31, with the bowl 7 under the outlet end 21 of the siphon tube 15. First, the beaker 13 is filled, to a level above the curved upper end 17 of the siphon tube 15, with a liquid 33 which is the same kind of liquid as the liquid 11 in bowl 7. The liquid 11 and 33 is non-reactive with the solid material to be weighed and, in the case of an explosive solid material, is also capable of desensitizing the explosive material. For example, the explosive material may be lead azide ($PbN_6$) having an atomic weight of about 291 and a dry, crystal density (as distinguished from bulk density) of 4.80 grams/cc., and the desensitizing liquid 33 may be the trichlorotrifluoroethane, $CCl_2FCF_2Cl$, having a density of 1.564 grams/cc., at 25°C. As soon as the liquid level reaches the uppermost point within the curved end 17 of the siphon tube 15, the tube automatically starts siphoning the liquid 33 from the beaker. This siphoning continues until the liquid level drops to the open end 23, at which time it is terminated by air entering the open end.

When the siphoning action stops, the liquid 33 stabilizes at a level, determined by the height of the open end 23, at which the volume of the liquid is a constant, but unknown, maximum. Then the weight of the vessel 5 plus this maximum volume of liquid 33 is recorded from scale 1.

Next, a quantity of the solid explosive material 9', lead azide in this example, to be weighed is placed within the vessel 5 while wetted by the same kind of liquid, for example, by scooping part of the material 9 from the supply bowl 7. The amount of solid material 9' must be sufficient to temporarily raise the level of the liquid 33 at least to the self-siphoning level described above (if a siphoning vessel is used) at which time the tube 15 automatically restores the level to that of the open end 23, by removing a volume of the liquid equal to the volume of the solid material 9' plus the liquid film or coating carried thereby. Then, the weight of vessel 5, with the remaining liquid 33' and solid material 9', is recorded.

The dry weight of the wet solid explosive material 9' placed in the liquid-filled beaker 13 is calculated as follows.

Let:

$T$ = tare or weight of empty vessel 5;
$L_1$ = weight of remaining liquid 33' including the liquid film;
$L_2$ = weight of liquid displaced by dry solid material 9' alone;
$L_3$ = weight of liquid film introduced on (wet) solid material 9' (part of $L_1$);
$D_L$ = density of liquid;
$S$ = dry weight of solid material 9';
$D_S$ = dry density of solid material 9';
$V_S$ = volume of dry solid material;
$V_2$ = volume of liquid displaced by dry solid material alone;
$A = L_1 + L_2 + T$ = weight of vessel 5 filled with liquid only; and
$B = (L_1 - L_3) + (S\ 30\ L_3) + T$
$= L_1 + S + T$ = weight of vessel 5 filled with liquid and solid material.

Subtracting $A$ from $B$ gives $$B - A = S - L_2, \text{ or}$$
$$B = A + S - L_2. \quad (1)$$

That is, the weight of the vessel with the liquid and solid material is equal to the weight of the vessel filled with liquid alone plus the weight of the dry solid material minus the weight of the liquid displaced thereby. From (1), $$S = B - A + L_2. \quad (2)$$

Since density equals mass per unit volume, and the volume $V_2$ of the liquid displaced by the dry solid material alone equals to volume $V_S$ of the dry solid material, $$L_2 = D_L V_2 = D_L V_S = D_L(S/D_S). \quad (3)$$

Combining equations (2) and (3), $$S = D_S(B - A/D_S - D_L). \quad (4)$$

where $A$ and $B$ are the two measured weights obtained as described above, and $D_S$ and $D_L$ are known. For example, if $B$ is 270 grams and $A$ is 220 grams, using lead azide and $CCl_2FCF_2Cl$, the weight $S$ of the dry explosive material 9' is:

$$S = 4.80 \times (270 - 220/4.80 - 1.564) = 73.3 \text{ grams}.$$

Since density values for most known explosive materials are known to the nearest hundreth, the accuracy of this method of weighing explosive materials is at least 99%.

In a second application of the present method, the dry density $D_S$ of a solid material, such as lead azide, can be experimentally determined (or confirmed) by adding a known dry weight $S$ of the wet solid material 9' to the vessel 5 after weighing the vessel with liquid only, such as $CCl_2FCF_2Cl$, of known density $D_L$, to determine weight $A$, recording the new weight $B$, and solving equation (4) for the density $D_S$. This application of the method assumes that the dry weight of the sample of the solid material 9' can be determined by some other method, and the accuracy of the resulting value of $D_S$ depends largely upon the accuracy of this dry weight.

The method described above may be modified slightly to isolate a desired dry weight $S$ of a given wet solid material 9' from a source, e.g. in a bowl 7, of the material 9 in granular form. First, the weight $A$ of the vessel 5 filled with the liquid 33 is determined as described above. Then, the weight $B$, which the vessel 5 with the solid material 9' and the remaining liquid 33' should have, is calculated by combining equations (1) and (3), as follows, $$B = A + S - D_L(S/D_S). \quad (5)$$

and substituting the known values of $A$, $S$, $D_L$ and $D_S$. Then, while observing the reading on the scale 1, wet granular solid material 9 is dispensed in small quantities from bowl 7 to vessel 5 until the observed weight is equal to the calculated value of B, at which time the desired amount S of the solid material has been isolated and may be removed from the vessel 5. The solid material may be explosive lead azide, and the liquid may be the desensitizing liquid $CCl_2FCF_2Cl$, as in the first two applications of the invention. Like the first method described, the accuracy of this modified method is at least 99%.

The nature of the present invention is such that the quantities $L_1$ and $L_3$ cancel out in deriving the equation (1), and do not appear in any of the final equations. Thus, it is unnecessary to determine the weight of either the remaining liquid ($L_1$) in the vessel or the liquid film ($L_3$) on the wet sample added to the vessel. Similarly, it is unnecessary to determine the weight $L_2$ or the volume $V_2$ of the displaced liquid. If desired, the value of $L_1$ could be determined from $B = L_1 + S + T$, above, and $L_2$ and $V_2$ could be determined from Equation (3). $L_2$ could also be determined from Equation (1). The value of $L_3$ is indeterminate.

It will be understood that, to obtain accurate results, the present method should be carried out at sea level, where the weights measured by the scale are equal to the actual masses involved, and at the temperature at which the liquid density is known.

What is claimed is:

1. A method of accurately determining the dry weight or dry density of a quantity of a solid material of known dry density or dry weight, respectively, wet by a film of a non-reactive liquid of known density, comprising the following steps:

filling a cup-shaped vessel, having an overflow means which determines a constant maximum volume, with the same kind of liquid to the level determined by said overflow means;

weighing the vessel with its liquid filling;

placing said solid material with its liquid film in said liquid-filled vessel, thereby displacing part of the liquid from the vessel;

weighing the vessel with the solid material and the remaining liquid; and calculating the dry weight $S$ or the dry density $D_S$ of the solid material, using the known dry density or dry weight, respectively, of the solid material, the known density $D_L$ of the liquid, the two measured weights, and the formula $$S = D_S(B - A/D_S - D_L)$$

where $B$ is the measured weight of the vessel filled with solid and liquid, and $A$ is the measured weight of the vessel filled with liquid alone.

2. The method of claim 1, wherein said overflow means comprises a siphon tube having an upper U-shaped end portion attached to and extending through the side wall of said vessel and a lower end portion extending below the liquid level determined by said upper end portion, whereby said tube automatically starts siphoning the liquid from said vessel when the liquid level is raised above said U-shaped end portion and stops siphoning when the liquid level drops below the open end of said U-shaped end portion.

3. The method of claim 1, wherein said solid material is an explosive material that cannot be weighed directly in dry form without danger of exploding and said liquid is capable of desensitizing said explosive material.

4. The method of claim 3, wherein said explosive material is lead azide.

5. The method of claim 4, wherein said liquid is $CCl_2FCF_2Cl$.

6. A method of isolating a desired dry weight of a granular solid material of known dry density from a supply of said material wet with a film of a non-reactive liquid of known density, comprising the following steps:

filling a cup-shaped vessel, having an overflow means determining a given maximum volume, with the same kind of liquid to the level determined by said overflow means;

weighing the vessel with its liquid filling;

calculating the total weight of the vessel with the desired quantity of solid material and its liquid film placed therein and displacing part of the liquid therefrom, from the formula $$B = A + S - D_L(S/D_S)$$

where $B$ is the total weight, $A$ is the weight of the vessel filled with liquid only, $S$ is the dry weight of the solid material, $D_L$ is the density of the liquid, and $D_S$ is the dry density of the solid material; and then dispensing said wet granular material into said liquid-filled vessel, while weighing the vessel and its contents, until said calculated total weight is measured.

* * * * *